United States Patent
Lai et al.

(10) Patent No.: US 10,978,102 B1
(45) Date of Patent: Apr. 13, 2021

(54) THERMALLY ASSISTED MAGNETIC HEAD, HEAD GIMBAL ASSEMBLY AND HARD DISK DRIVE

(71) Applicant: SAE Magnetics (H.K.) Ltd., Hong Kong (HK)

(72) Inventors: Wai Yuen Anthony Lai, Hong Kong (HK); Hon Kit Lau, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 16/885,328

(22) Filed: May 28, 2020

(51) Int. Cl.
  *G11B 5/31* (2006.01)
  *G11B 5/48* (2006.01)
  *G11B 5/39* (2006.01)
  *G11B 5/127* (2006.01)
  *G11B 5/00* (2006.01)

(52) U.S. Cl.
  CPC .......... *G11B 5/4866* (2013.01); *G11B 5/1278* (2013.01); *G11B 5/314* (2013.01); *G11B 5/315* (2013.01); *G11B 5/3116* (2013.01); *G11B 5/3133* (2013.01); *G11B 5/3143* (2013.01); *G11B 5/3912* (2013.01); *G11B 2005/0021* (2013.01)

(58) Field of Classification Search
  None
  See application file for complete search history.

(56) References Cited

U.S. PATENT DOCUMENTS

| | | | |
|---|---|---|---|
| 9,741,377 B1 * | 8/2017 | Sasaki | G11B 5/314 |
| 9,852,752 B1 * | 12/2017 | Chou | G11B 5/6082 |
| 10,068,596 B2 | 9/2018 | Staffaroni et al. | |
| 10,115,423 B1 * | 10/2018 | Gubbins | G11B 5/3116 |
| 10,186,292 B1 * | 1/2019 | Krishnamurthy | G11B 5/3136 |
| 10,482,906 B2 | 11/2019 | Chen et al. | |
| 10,714,137 B1 * | 7/2020 | Krishnamurthy | G11B 5/3116 |
| 10,811,038 B1 * | 10/2020 | Peng | G11B 5/40 |
| 2012/0155232 A1 | 6/2012 | Schreck et al. | |
| 2015/0325261 A1 * | 11/2015 | Yang | G11B 5/3133 369/13.33 |
| 2017/0249962 A1 * | 8/2017 | Peng | G11B 5/314 |
| 2018/0096702 A1 * | 4/2018 | Staffaroni | G11B 5/3133 |
| 2018/0211686 A1 * | 7/2018 | Nishimura | G11B 5/314 |
| 2019/0066722 A1 * | 2/2019 | Maletzky | G11B 5/3133 |
| 2019/0096435 A1 * | 3/2019 | Gao | G11B 5/4866 |

* cited by examiner

*Primary Examiner* — Jefferson A Evans

(57) ABSTRACT

A thermally assisted magnetic head including a main magnetic pole layer having a magnetic pole end face arranged in a medium-opposing surface, a near-field transducer which generates a near-field light for heating the magnetic recording medium, a waveguide guiding light to the near-field transducer; and an optical side shield being arranged in the medium-opposing surface side of the waveguide and being formed so as to sandwich a part of the near-field transducer, in the medium-opposing surface side, from both sides of a direction along the medium-opposing surface. The near-field transducer includes a protruding end-part (PEG). Then the protruding end-part is arranged to have a PEG end-surface at a position receded from the medium-opposing surface.

10 Claims, 24 Drawing Sheets

THERMALLY ASSISTED MAGNETIC HEAD, HEAD GIMBAL ASSEMBLY AND HARD DISK DRIVE

BACKGROUND

Field of the Invention

The present invention relates to a thermally assisted magnetic head recording data on a magnetic recording medium by thermally assisted magnetic recording using near-field light, a head gimbal assembly and a hard disk drive each having the thermally assisted magnetic head.

Related Background Art

In recent years, as magnetic disk drives have been increasing their recording densities, thin-film magnetic heads recording data on a magnetic recording media have been required to further improve their performances. As the thin-film magnetic heads, those of composite type having a structure in which a reproducing head having a magnetoresistive device (hereinafter, referred to also as an "MR device") for read and a recording head having an electromagnetic coil device for write are laminated have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording (hereinafter, referred to as a "TAMR") has been conventionally proposed. When recording data on a magnetic recording medium having a large coercive force, the thin-film magnetic head employing the thermally assisted magnetic recording (referred to as a "thermally assisted magnetic head") records data while instantaneously heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic head, it becomes possible to make the magnetic fine particles finer as well as stabilize recording in the magnetic disk drive.

On the other hand, near-field light is used as means for heating the magnetic recording medium in the conventional thermally assisted magnetic head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium. A conventional technology concerning the thermally assisted magnetic recording is disclosed in, for example, US 2012-0155232 (also called patent document 1).

By the way, in the thermally assisted magnetic head, a member, which is called a near field transducer (hereinafter, referred to as an "NFT") or a plasmon generator, is provided for generating the near-field light.

Besides, the thermally assisted magnetic head, which a "PEG" is formed in the NFT ("PEG formed Head"), is conventionally known (for example, U.S. Pat. No. 10,068,596 (also called patent document 2), USP 10,482,906 (also called patent document 3). The "PEG" is a small protruding part for concentrating the near-field light.

SUMMARY OF THE INVENTION

Then, a thermally assisted magnetic head 400, illustrated in FIG. 17, FIG. 18, is known as the conventional "PEG formed Head". FIG. 17 is a front view, partially omitted, illustrating an air bearing surface (hereinafter, referred to as an "ABS") 401 of the thermally assisted magnetic head 400. FIG. 18 is a plan view illustrating a sectional surface including an upper surface of an NFT 413 of the thermally assisted magnetic head 400.

The thermally assisted magnetic head 400 includes a main magnetic pole layer 410, a heat sink 411, an insulating layer 412, the NFT 413, a cladding layer 414, an insulating layer 415, an insulating layer 416 and a wave guide 417. A PEG 418 is formed in the tip, on the ABS 401 side, of the NFT 413. Further, an end-surface 418*b* of the PEG 418 is arranged in the ABS 401.

Then in the thermally assisted magnetic head 400, when laser light reaches the NFT 413 through the wave guide 417, the near-field light seeps from the PEG 418 of the NFT 413. In this case, the near-field light is concentrated because of the PEG 418.

However, in the thermally assisted magnetic head 400, the end-surface 418*b* of the PEG 418 is arranged in the ABS 401. Therefore, a thermal zone, on the magnetic recording media, is likely to be enlarged in accordance with the enhancement of the intensity of laser light. The thermal zone is a part which is heated by the irradiation of the near-field light.

Namely, in the thermally assisted magnetic head 400, as illustrated in FIG. 21, the near-field light nf1 seeps from the end-surface 418*b* of the PEG 418, and it is irradiated to a hard disk 499. In this case, the thermal zone 499*a* of the hard disk 499 is heated by the near-field light nf1.

However, when the intensity of laser light is enhanced, as illustrated in FIG. 22, the near-field light nf2 seeps in a larger area (nf2>nf1). Therefore, a thermal zone 499*b*, which is larger than the thermal zone 499*a*, is formed (499*b*>499*a*).

On the other hand, as illustrated in FIG. 19, FIG. 20, a thermally assisted magnetic head 500, including optical shields 420, is known as the conventional PEG formed Head. The optical shields 420 are arranged so as to sandwich the PEG 418 form their both sides.

Because, the thermally assisted magnetic head 500 includes the optical shields 420, laser light, leaks out of the NFT 413, is cut off by the optical shields 420.

However, in the thermally assisted magnetic head 500, as illustrated in FIG. 23, the end-surface 418b is arranged in the ABS 401. Therefore, when the near-field light nf1 seeps from the end-surface 418b, the near-field light nf1 is irradiated to the hard disk 499 without cutting off by the optical shields 420, similar with the thermally assisted magnetic head 400.

Therefore, in the thermally assisted magnetic head 500, as illustrated in FIG. 24, when the intensity of laser light is enhanced, the near-field light nf2, which is larger than the near-field light nf1, seeps, similar with the thermally assisted magnetic head 400. Therefore, the thermal zone 499b, which is larger than the thermal zone 499a, is formed.

Therefore, in case of the conventional PEG formed Head, even if the optical shields 420 are arranged, the thermal zone is likely to be enlarged in accordance with the enhancement of the intensity of laser light.

Hence the present invention is made to solve the above problem, and it is an object to provide a thermally assisted magnetic head having the structure, which is devised so that the thermal zone, due to the near-field light, is hardly enlarged even if the intensity of laser light is enhanced, in the case which the NFT includes the PEG, the head gimbal assembly and the hard disk drive having the thermally assisted magnetic head.

To solve the above problem, the present invention is a thermally assisted magnetic head including: a main magnetic pole layer having a magnetic pole end face arranged in a medium-opposing surface opposing to a magnetic recording medium; a near-field transducer which generates a near-field light for heating the magnetic recording medium; a waveguide guiding light to the near-field transducer; and an optical side shield being arranged in the medium-opposing surface side of the waveguide and being formed so as to sandwich a part of the near-field transducer, in the medium-opposing surface side, from both sides of a direction along the medium-opposing surface; wherein the near-field transducer includes a protruding end-part, arranged in the medium-opposing surface side, the protruding end-part has a recess structure which a PEG end-surface, along the medium-opposing surface, is arranged in a position receding from the medium-opposing surface.

In case of the above-described thermally assisted magnetic head, it is possible that the waveguide includes a waveguide end-part, arranged in the medium-opposing surface, the waveguide end-part is arranged between the PEG end-surface and the medium-opposing surface.

Further, it is possible that the optical side shield includes a shield surface, arranged in the medium-opposing surface, and a shield concave part, extending from the shield surface along an intersecting direction, which intersects to the medium-opposing surface, the PEG end-surface is arranged inside of the shield concave part.

Further, it is possible that the shield concave part includes a pair of opposing wall parts, extending from the shield surface, along the intersecting direction, the protruding end-part comprises a pair of PEG side-surfaces, extending from the PEG end-surface, along the intersecting direction, the protruding end-part and the optical side shield are formed so that the opposing wall parts and the PEG side-surfaces are opposite each other.

Further, it is possible that the shield concave part is formed so that a shield depth, along the intersecting direction, is larger than a PEG depth, of the protruding end-part, along the intersecting direction.

Further, it is possible that the shield concave part is formed so that a concave part width, along the medium-opposing surface, is larger than a PEG width, of the protruding end-part, along the medium-opposing surface.

Further, it is possible that the protruding end-part is arranged in the middle of the shield concave part, along the medium-opposing surface.

Further, it is possible that the PEG end-surface of the protruding end-part is arranged in the position recedes from the medium-opposing surface, than a middle line showing the middle of the intersecting direction.

Further, it is possible that the protruding end-part and the shield concave part are formed so that the difference of the concave part width and the PEG width is smaller than the PEG width.

Further, the present invention provides a head gimbal assembly including a thermally assisted magnetic head, the thermally assisted magnetic head including: a main magnetic pole layer having a magnetic pole end face arranged in a medium-opposing surface opposing to a magnetic recording medium; a near-field transducer which generates a near-field light for heating the magnetic recording medium; a waveguide guiding light to the near-field transducer; and an optical side shield being arranged in the medium-opposing surface side of the waveguide and being formed so as to sandwich a part of the near-field transducer, in the medium-opposing surface side, from both sides of a direction along the medium-opposing surface; the near-field transducer includes a protruding end-part, arranged in the medium-opposing surface side, the protruding end-part has a recess structure which a PEG end-surface, along the medium-opposing surface, is arranged in a position receding from the medium-opposing surface.

Then, the present invention provides a hard disk drive including a head gimbal assembly having a thermally assisted magnetic head, and a magnetic recording medium opposing the thermally assisted magnetic head, the thermally assisted magnetic head including: a main magnetic pole layer having a magnetic pole end face arranged in a medium-opposing surface opposing to a magnetic recording medium; a near-field transducer which generates a near-field light for heating the magnetic recording medium; a waveguide guiding light to the near-field transducer; and an optical side shield being arranged in the medium-opposing surface side of the waveguide and being formed so as to sandwich a part of the near-field transducer, in the medium-opposing surface side, from both sides of a direction along the medium-opposing surface; the near-field transducer includes a protruding end-part, arranged in the medium-opposing surface side, the protruding end-part has a recess structure which a PEG end-surface, along the medium-opposing surface, is arranged in a position receding from the medium-opposing surface.

The present invention will be more fully understood from the detailed description given hereinbelow and the accompanying drawings which are given by way of illustration only, and thus are not to be considered as limiting the present invention.

DETAILED DESCRIPTION OF THE EMBODIMENTS

In the following, embodiments of the present invention will be described with reference to the drawings. Note that the same components will be referred to with the same numerals or letters, while omitting their overlapping descriptions.

(Structure of the Thermally Assisted Magnetic Head)

Figure 1:
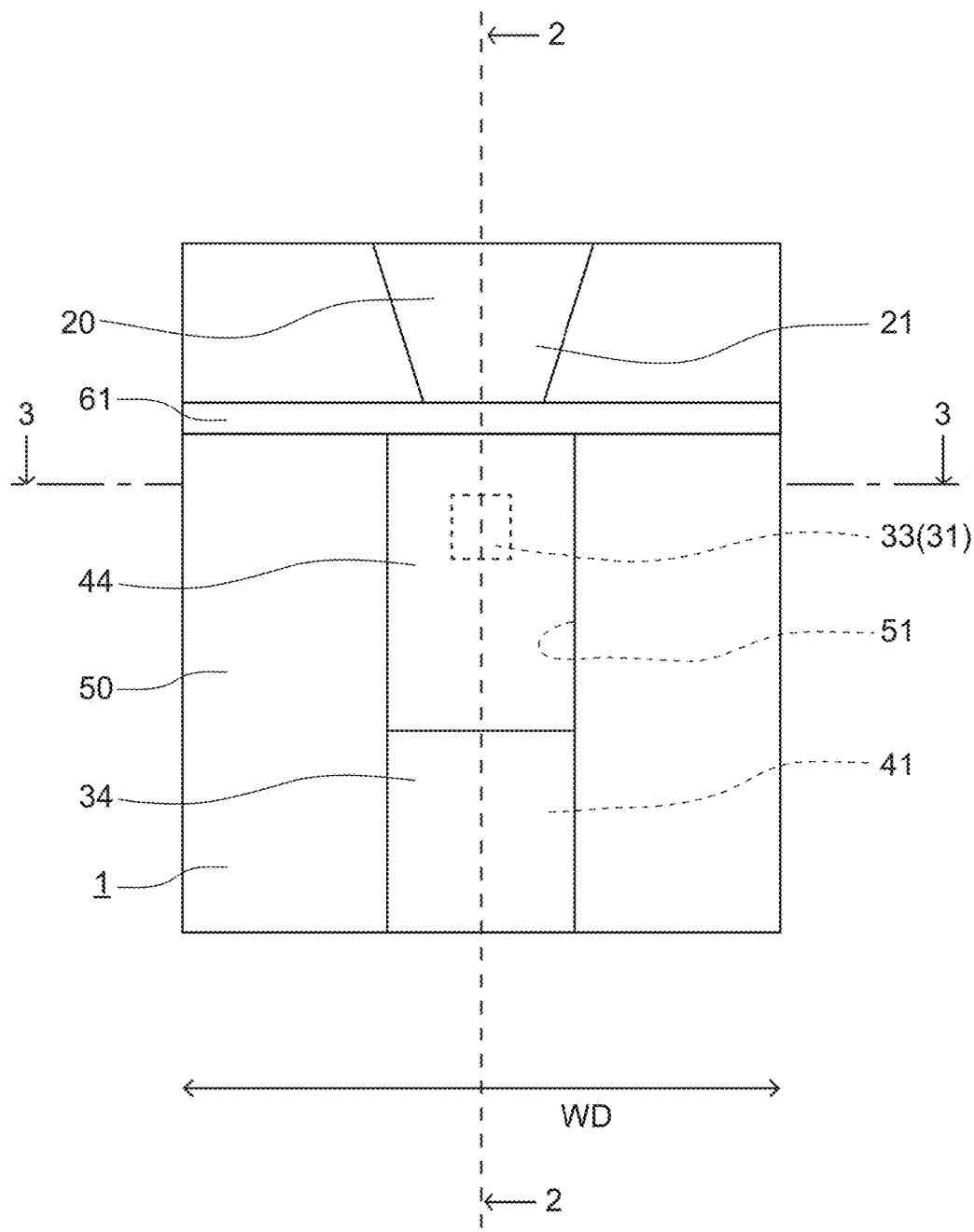
FIG. 1 is a front view illustrating a principal part of the ABS of the thermally assisted magnetic head according to an embodiment of the present invention.
Figure 2:
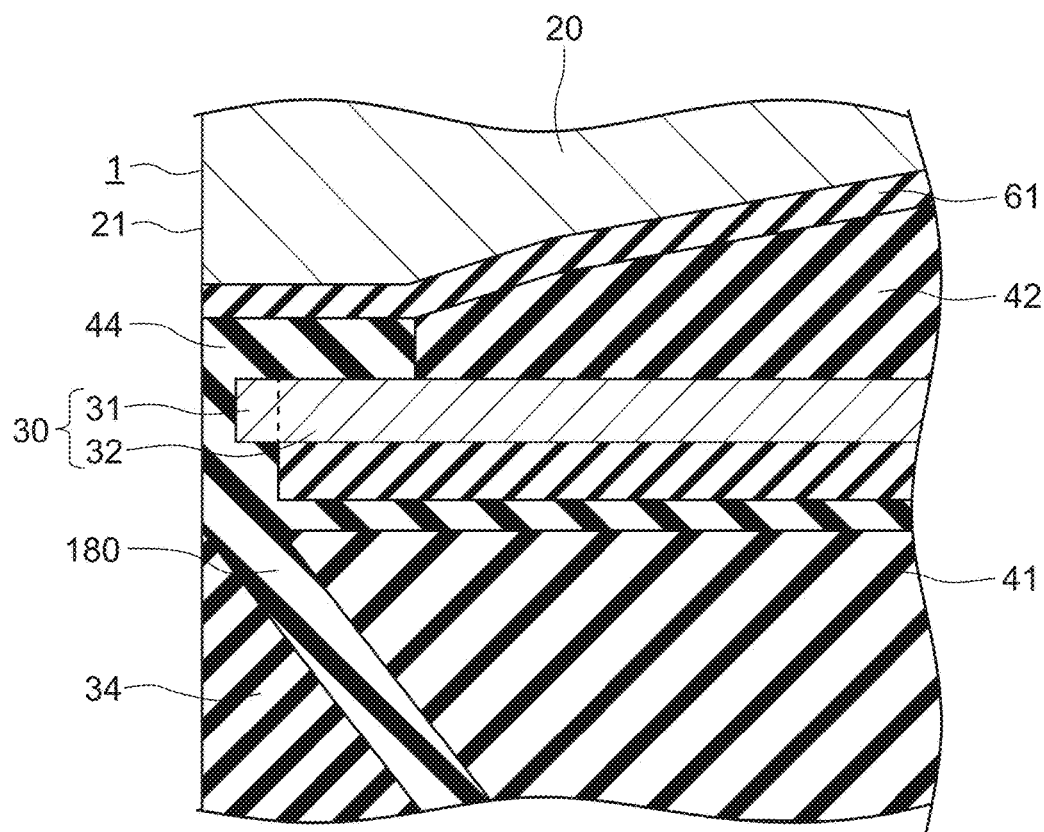
FIG. 2 is a sectional view of the thermally assisted magnetic head taken along the line 2-2 in FIG. 1.
Figure 3:
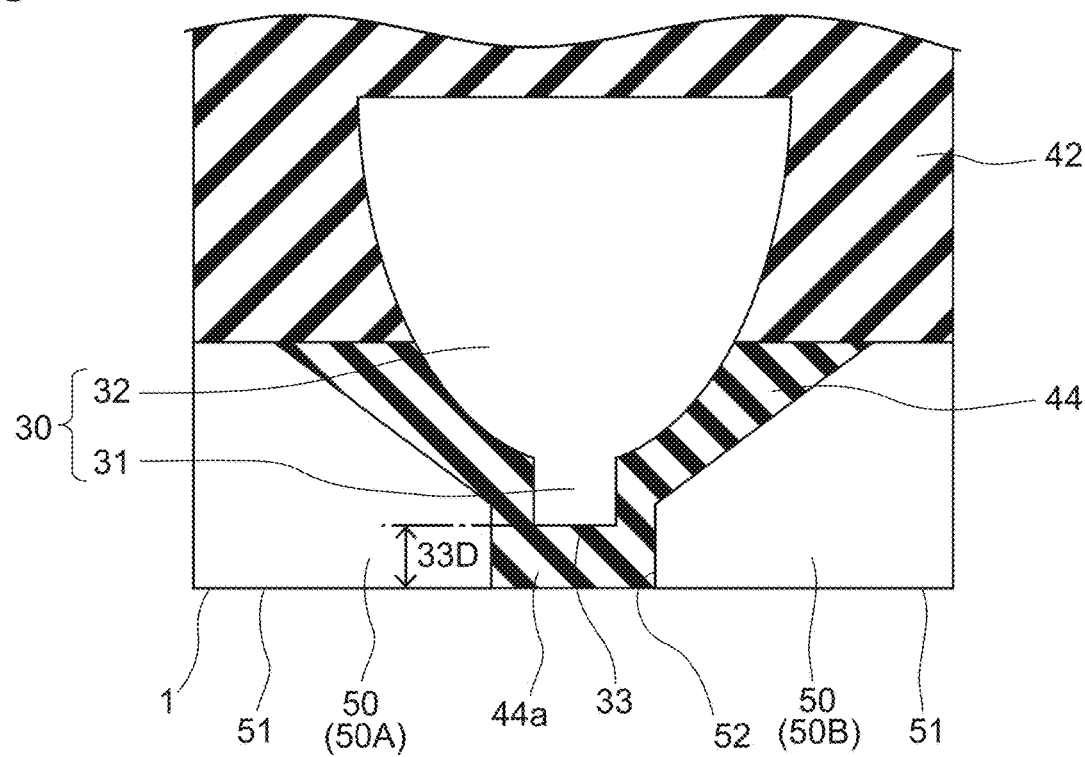
FIG. 3 is a plan view illustrating a sectional surface of the thermally assisted magnetic head taken along the line 3-3 in FIG. 1.
Figure 4:
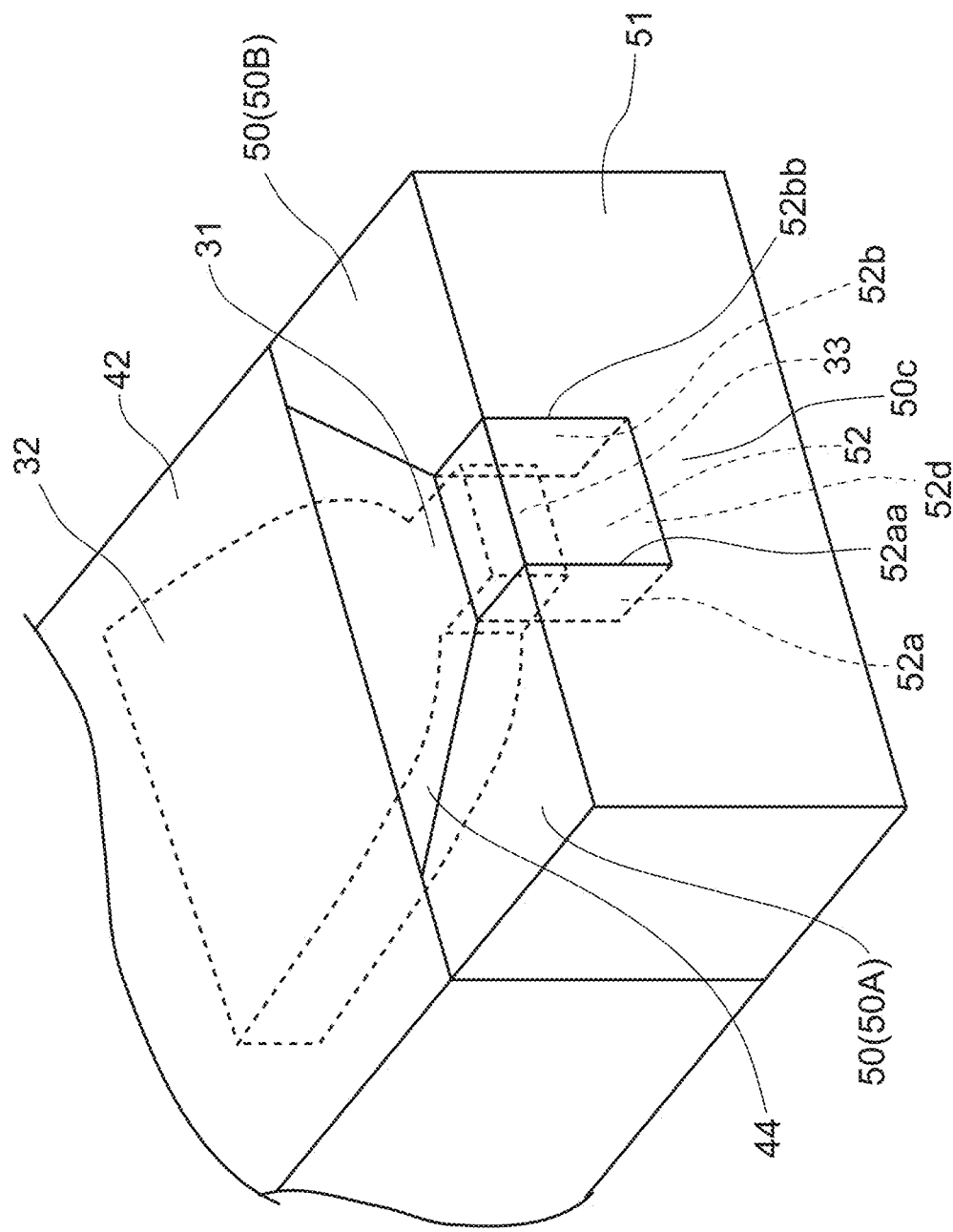
FIG. 4 is a perspective view, seen from the ABS, of the thermally assisted magnetic head taken along the line 3-3 in FIG. 1.
Figure 5:
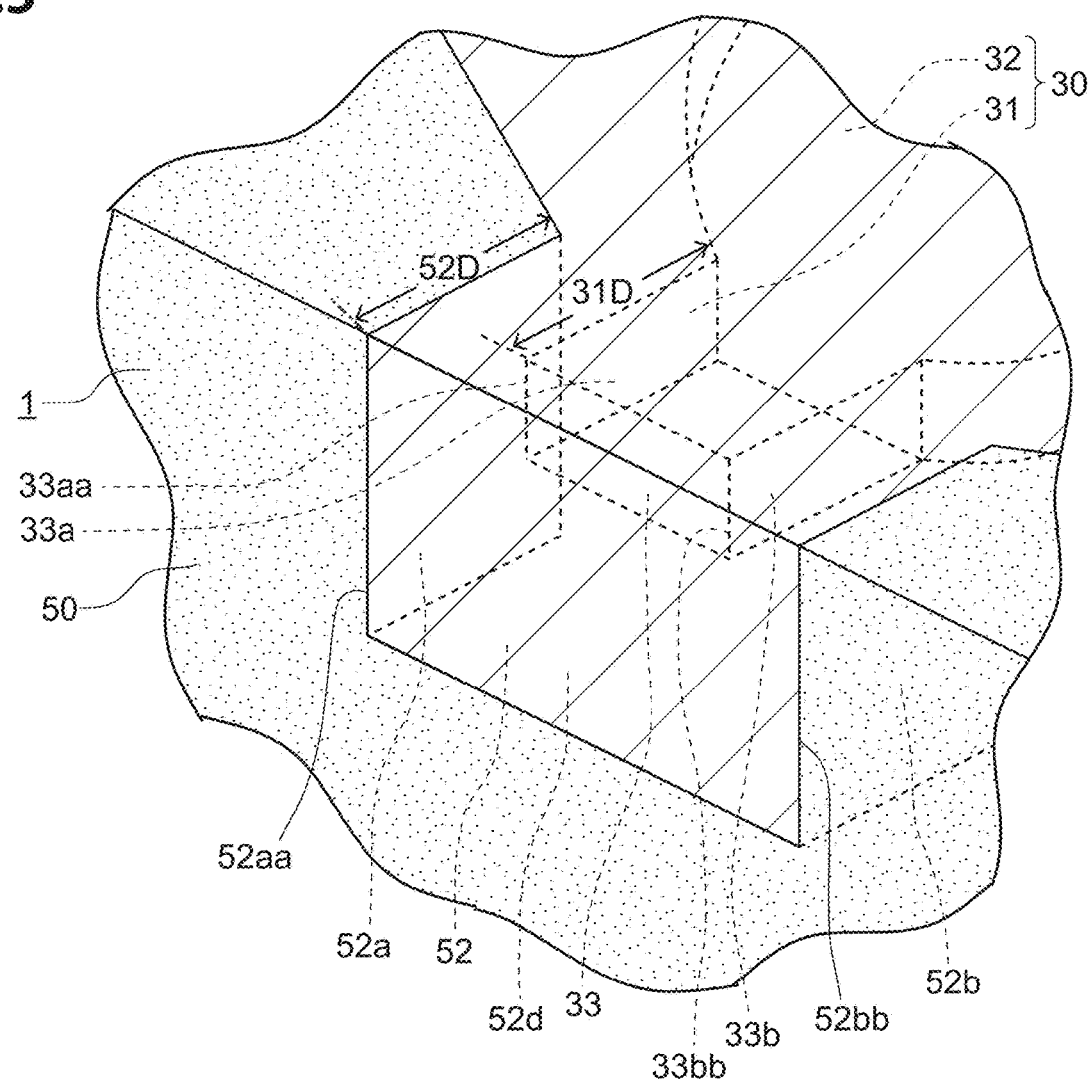
FIG. 5 is a perspective view, with enlargement, seen from the different direction in FIG. 3 of the thermally assisted magnetic head taken along the line 3-3 in FIG. 1.
Figure 6:
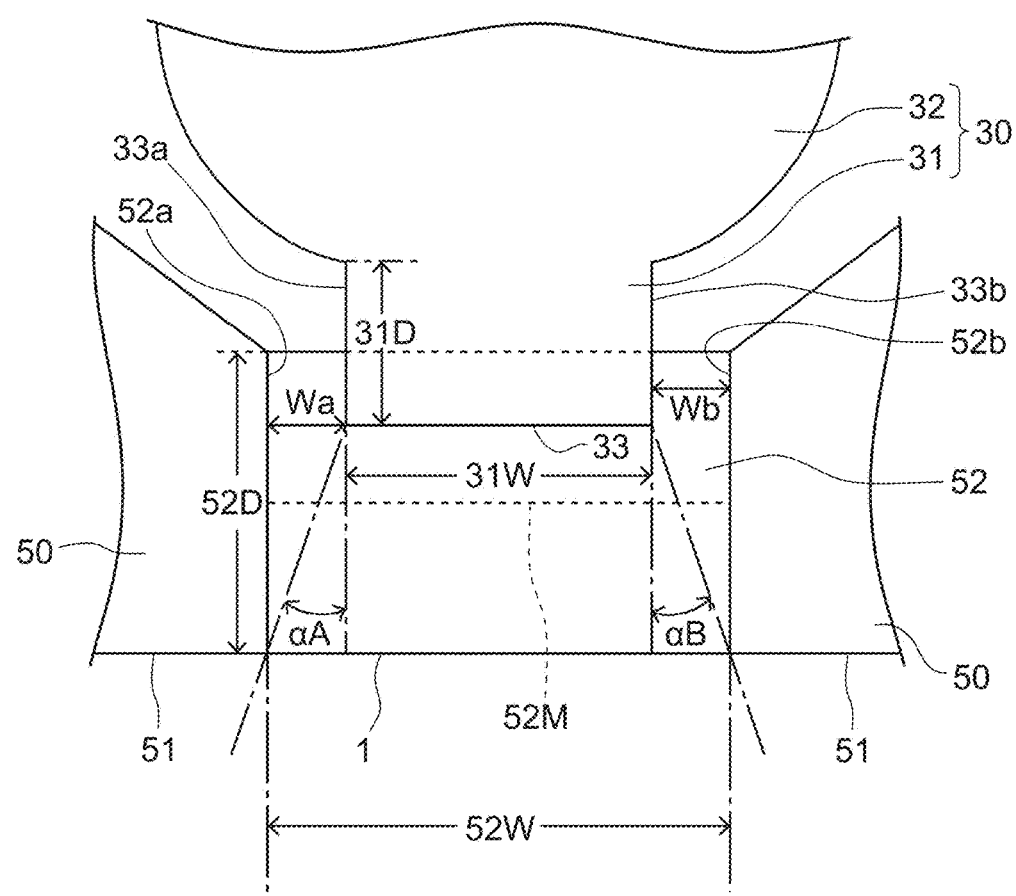
FIG. 6 is a plan view, partially omitted, illustrating principal parts of an optical side shield and a near field transducer.
Figure 7:
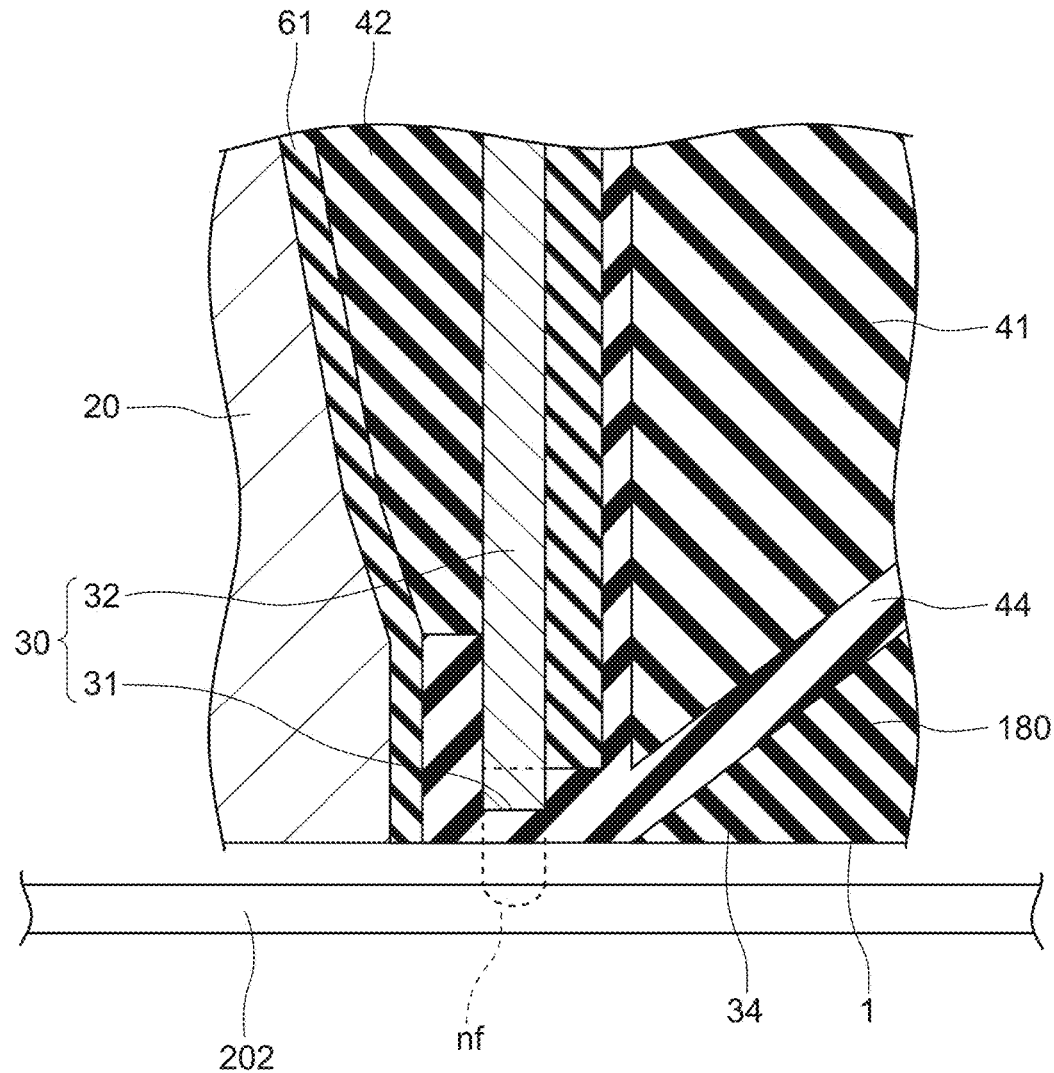
FIG. 7 is a sectional view, corresponding to FIG. 2, illustrating principal parts of the thermally assisted magnetic head and the hard disk.

To begin with, structure of the thermally assisted magnetic head according to the embodiment of the present invention will be explained with reference to FIG. 1 to FIG. 7. Here, FIG. 1 is a front view illustrating a principal part of a medium opposing surface (Air Bearing Surface, hereinafter, also referred to as an "ABS") 1 of the thermally assisted magnetic head 180 according to an embodiment of the present invention. FIG. 2 is a sectional view of the thermally assisted magnetic head 180 taken along the line 2-2 in FIG. 1. FIG. 3 is a plan view illustrating a sectional surface of the thermally assisted magnetic head 180 taken along the line 3-3 in FIG. 1. FIG. 4 is a perspective view, seen from the ABS 1, of the thermally assisted magnetic head 180 taken along the line 3-3 in FIG. 1. FIG. 5 is a perspective view, with enlargement, seen from the different direction in FIG. 3 of the thermally assisted magnetic head 180, taken along the line 3-3 in FIG. 1. FIG. 6 is a plan view, partially omitted, illustrating principal parts of an optical side shield (hereinafter, also referred to as an "OSS") 50 and a near field transducer (NFT) 30. FIG. 7 is a sectional view illustrating principal parts of the thermally assisted magnetic head 180 and hard disk 202, being a magnetic recording medium.

The thermally assisted magnetic head 180 is formed on a slider (not illustrated) made of ceramic material such as aluminum oxide-titanium carbide ($Al_2O_3.TiC$) or the like.

As illustrated in FIG. 1, FIG. 2, the thermally assisted magnetic head 180 has the ABS 1, a main magnetic pole layer 20, the NFT 30, a waveguide 41, a waveguide blocker 34, the OSS 50 and an under-formed layer 61. The thermally assisted magnetic head 180 has a symmetry structure which is substantially symmetric about a symmetry plane (a plane along 2-2 line in FIG. 1).

The thermally assisted magnetic head 180 has a structure which the OSS 50, the waveguide 41, the waveguide blocker 34, the NFT 30, the under-formed layer 61 and the main magnetic pole layer 20 are formed on the not-illustrated slider.

The main magnetic pole layer 20 is formed using a magnetic material made of a ferromagnetic body such as NiFe, CoNiFe, CoFe or the like. The ferromagnetic body such as NiFe, CoNiFe, CoFe or the like has a high magnetic permeability. Therefore, a magnetic flux is likely to transmit through the main magnetic pole layer 20, much more magnetic flux transmits through the main magnetic pole layer 20. For this reason, more strong magnetic flux corresponding to the recording magnetic field is emitted from the main magnetic pole layer 20 to the hard disk 202 (later-described).

The thermally assisted magnetic head 180 has a thin-film coil for generating the recording magnetic field. On account of illustration, the illustration of the thin-film coil is omitted.

As illustrated in FIG. 1, the main magnetic pole layer 20 has a magnetic pole end face 21, which is arranged in the ABS 1. The magnetic pole end face 21 has a bevel form which a width in the direction along the ABS 1 (the direction along the ABS 1 is also referred to as "ABS direction") gradually decreases toward the waveguide blocker 34.

The NFT 30 generates a near-field light of (see FIG. 7) for heating the hard disk 202. The NFT 30 is made of metal and formed of, for example, one of Au, Ag, Al, Cu, Pd, Pt, Rh, Ir or an alloy made of a plurality of those elements.

The NFT 30 is a member having a thick plate-like shape. As illustrated in FIG. 3, FIG. 4, FIG. 5, the NFT 30 has a PEG 31 and a variable width part 32.

The PEG 31 is a protruding end-part, according to the present invention, and it is formed on the ABS 1 side of the variable width part 32. The part, having the narrowest width in the NFT 30, and protruding toward the ABS 1, is the PEG 31.

The PEG 31 has a PEG end-surface 33, formed along the ABS 1. As also illustrated in FIG. 1, FIG. 4, the PEG end-surface 33 is formed in a rectangular shape in the ABS 1. Further, as illustrated in FIG. 6, the PEG 31 has a pair of PEG side-surfaces 33a, 33b, which is extending along a direction intersecting the ABS 1 (also referred to as intersecting direction) from the PEG end-surface 33. Note that the PEG end-surface 33 is able to be formed in a shape, being different from the rectangular shape, such as a circular shape, triangle shape or the like.

Then, the PEG end-surface 33 is arranged in a position receding from the ABS 1. The PEG end-surface 33, according to the embodiment, as illustrated in FIG. 3, is arranged in a position which is distant from the ABS 1 at an interval 33D. The structure, which the PEG end-surface 33 is arranged in a position receding from the ABS 1, is a "recess structure".

The variable width part 32 is formed in a rear side, being away from the ABS 1, of the PEG 31. The variable width part 32 has a wider width than the PEG 31. The variable width part 32 has a width, gradually increases as it is distanced more from the ABS 1.

The waveguide 41 is a member which guide a laser light to the NFT 30. The laser light, emitted from a not-illustrated laser diode, is entered the waveguide 41. The waveguide 41 is formed using a dielectric substance which transmits laser light, for example, such as $Ta_2O_5$ or the like.

The waveguide blocker 34 is a member made of Ru or the like. As illustrated in FIG. 2, the waveguide blocker 34 is formed in a position arranged in the ABS 1 side than the waveguide 41. The waveguide blocker 34 blocks a laser light so as not to reach the ABS 1. Further, as illustrated in FIG. 2, FIG. 3, an interposed layer 44 is formed near the waveguide blocker 34. The interposed layer 44 is formed using a material having a lower refractive index than that of the waveguide 41 (for example, insulating material such as alumina ($Al_2O_3$) or the like). The interposed layer 44 wraps the PEG 31 and a part, of the variable width part 32, which is connected with the PEG 31.

Further, as illustrated in FIG. 3, the interposed layer 44 has a block end-part 44a, being arranged in the ABS 1. The block end-part 44a is formed between the ABS 1 and the PEG end-surface 33. The PEG end-surface 33 is arranged in the rear side, of the block end-part 44a being away from the ABS 1.

Then, as illustrated in FIG. 2, an intermediate layer 42 is formed near the interposed layer 44. The intermediate layer 42 is formed using a material such as Au or the like. The intermediate layer 42 wraps the variable width part 32 in the position being away from the ABS 1 than the interposed layer 44.

The under-formed layer 61 is a member made of insulating material such as alumina ($Al_2O_3$) or the like, and it is formed between the main magnetic pole layer 20 and the interposed layer 44, the intermediate layer 42.

The OSS 50 is formed of a mechanically robust and optically opaque material that is resonant at the working wavelength of the NFT 30. The OSS 50 is able to be formed with Ru, for example. The OSS 50 absorbs a near-field light nf, applied from the NFT 30, thereby, the near-field light of is partially cut off.

The OSS 50 is arranged in the ABS 1 side of the waveguide 41, as illustrated in FIG. 3, FIG. 4, FIG. 5. The OSS 50 is formed so as to sandwich the part of the NFT 30 in the ABS 1 side (the PEG 31 and part of the variable width part 32, in the ABS 1 side) from the both sides along the ABS direction. The OSS 50 includes a first side part 50A, a second side part 50B and a connecting part 50c. The connecting part 50c connects the first side part 50A and the second side part 50B. The first side part 50A and the second side part 50B are arranged respectively in the left side, the right side, of the NFT 30, seen from the ABS 1. The connecting part 50c is arranged between the first side part 50A and the second side part 50B.

Then, the OSS 50 has a shield surface 51 and a shield concave part 52. As illustrated in FIG. 1, FIG. 4, FIG. 5, the shield surface 51 is arranged in the ABS 1. The shield surface 51 is formed in an almost rectangular shape. The shield concave part 52 is arranged in the middle of the shield surface 51 along the ABS direction.

The shield concave part 52 is formed in a groove like form extending, along the intersecting direction, from the shield surface 51. The shield concave part 52 is formed in the NFT 30 side of the connecting part 50c in the OSS 50.

As illustrated in FIG. 4, the shield concave part 52 has a pair of opposing wall parts 52a, 52b and a bottom part 52d, connecting the opposing wall part 52a to the opposing wall part 52b. The opposing wall parts 52a, 52b are planes extending from the shield surface 51 along the intersecting direction.

Then, as also illustrated in FIG. 3, the FIG. 6, the above-described PEG end-surface 33 and a part of the PEG 31, in the PEG end-surface 33 side, are arranged in the shield concave part 52.

(Description of the PEG 31 and the OSS 50)

Then, in the following, the PEG 31 and the OSS 50 will be explained in detail, with reference to FIG. 6 in addition to FIG. 4, FIG. 5.

As describe above, the PEG 31 includes the PEG side-surfaces 33a, 33b, the shield concave part 52 includes the opposing wall parts 52a, 52b. Especially, as illustrated in FIG. 5, FIG. 6, the PEG 31 and the OSS 50 are formed so that the respective PEG side-surfaces 33a, 33b are partially opposite to the respective opposing wall parts 52a, 52b.

Then, the shield concave part 52 is formed so that a shield depth 52D, along the intersecting direction, is formed larger than a PEG depth 31D, of the PEG 31, along the intersecting direction (52D>31D).

Further, the shield concave part 52 is formed so that a concave part width 52W, along the ABS direction, is larger than a PEG width 31W, of the PEG 31, along the ABS direction (52W>31W).

Further, the PEG 31 is arranged in the middle of the shield concave part 52, along the ABS direction. In this case, as illustrated in FIG. 6, the intervals of the opposing wall parts 52a, 52b, of the shield concave part 52, and the PEG side-surfaces 33a, 33b, of the PEG 31, are respectively PEG intervals Wa, Wb. Because the PEG 31 is arranged in the middle of the shield concave part 52 along the ABS direction, the PEG interval Wa is equal to the PEG interval Wb (Wa=Wb). However, it is possible that the PEG interval Wa is different from the PEG interval Wb (see FIG. 12).

Further, as illustrated in FIG. 6, the PEG end-surface 33 of the PEG 31 is arranged in the position which recedes from the ABS 1 than a middle line 52M, of the shield concave part 52, being a middle along the intersecting direction.

Furthermore, the PEG 31 and the shield concave part 52 are formed so that a difference (width difference) of the concave part width 52W and the PEG width 31W is smaller than the PEG width 31W. The difference of the concave part width 52W and the PEG width 31W corresponds to the sum of the PEG interval Wa and the PEG interval Wb. Therefore, the sum of the PEG interval Wa and the PEG interval Wb is smaller than the PEG width 31W (Wa+Wb<31W).

(Operation Contents of the Thermally Assisted Magnetic Head)

In the thermally assisted magnetic head 180, when data is recorded on the hard disk 202, a current, modulated according to the data to be recorded on the hard disk 202, is caused to flow through the not-illustrated thin-film coil. Then, the thin-film coil generates a recording magnetic field by the current. The recording magnetic field passes through the main magnetic pole layer 20, and a magnetic flux caused by the recording magnetic field is emitted from the magnetic pole end face 21 to the hard disk 202. With this magnetic flux, the data is recorded on the hard disk 202.

On the other hand, when the laser diode (not illustrated) emits the laser light, the laser light travels toward the ABS 1, after that, it reaches the waveguide 41. The laser light enters inside of the waveguide 41, and it travels inside of the waveguide 41 toward the ABS 1. Because the NFT 30 is arranged near the waveguide 41, the laser light is emitted to the NFT 30.

Then, the interposed layer 44, having a lower refractive index than that of the waveguide 41, is arranged between the waveguide 41 and the NFT 30. Therefore, when laser light enters the interposed layer 44 from the waveguide 41 and are totally reflected, evanescent light seeps near the surface of the interposed layer 44 having a lower refractive index. The use of the evanescent light makes it possible to match the phase speed thereof with the phase speed of surface plasmons and excite surface plasmons at the NFT 30.

The surface plasmons propagate to the PEG 31 arranged on the ABS 1 side of the NFT 30. Because the PEG 31 has a narrowest width in the NFT 30, the surface plasmons are concentrated on the PEG 31. Then, a near-field light nf, having a very high electric field intensity, is generated near the PEG 31.

The near-field light nf is applied, from the PEG end-surface 33 of the PEG 31, to the hard disk 202 and reaches the surface of the hard disk 202. Then, a limited extremely small region in the magnetic recording layer of the hard disk 202 is intensively heated by the near-field light nf. In the magnetic recording layer, the coercive force reduces to an extent at which data is able to be recorded by the magnetic flux caused by the recording magnetic field.

In the thermally assisted magnetic head 180, the coercive force is able to be reduced in the above-descried manner, so that data is able to be recorded also on a magnetic recording medium having a high coercive force for high-density recording.

Figure 17:
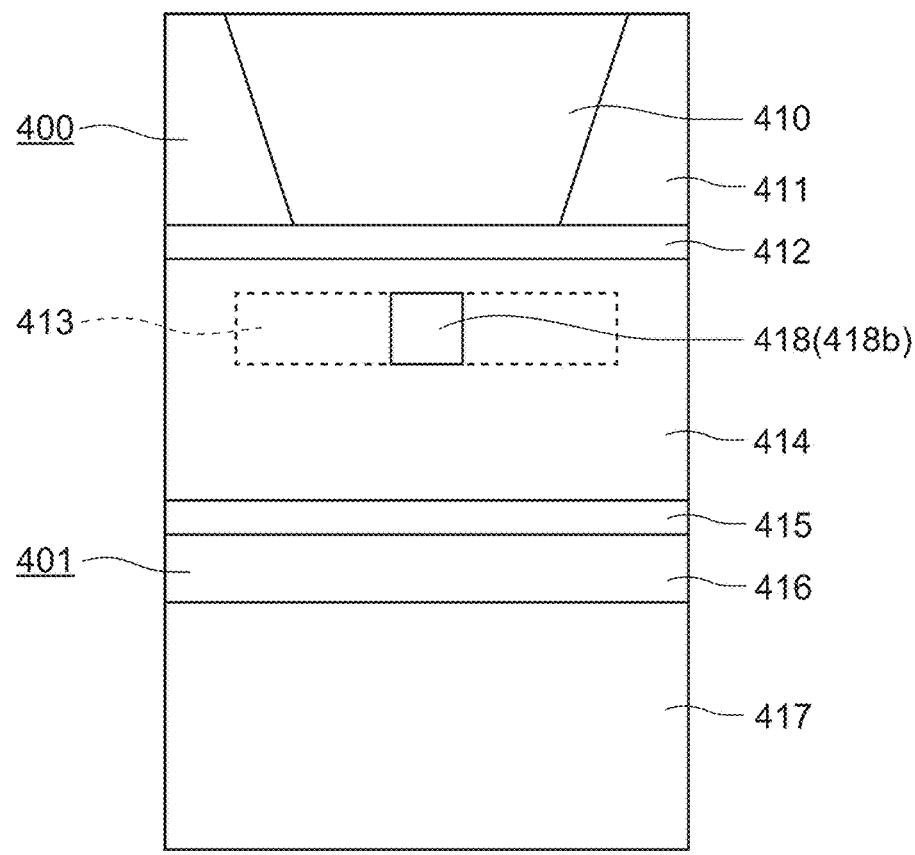
FIG. 17 is a front view, partially omitted, illustrating the ABS of the conventional thermally assisted magnetic head.
Figure 18:
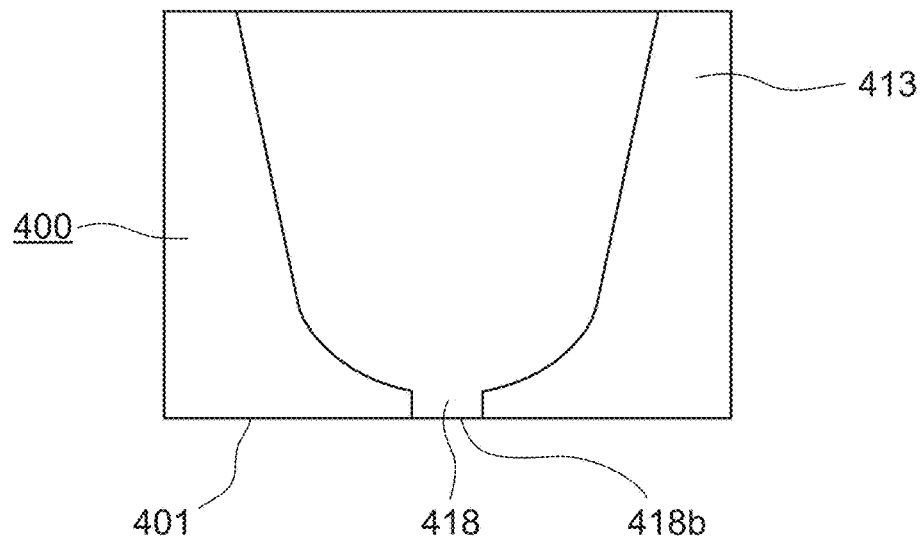
FIG. 18 is a plan view illustrating a sectional surface including an upper surface of an NFT of the conventional thermally assisted magnetic head.
Figure 19:
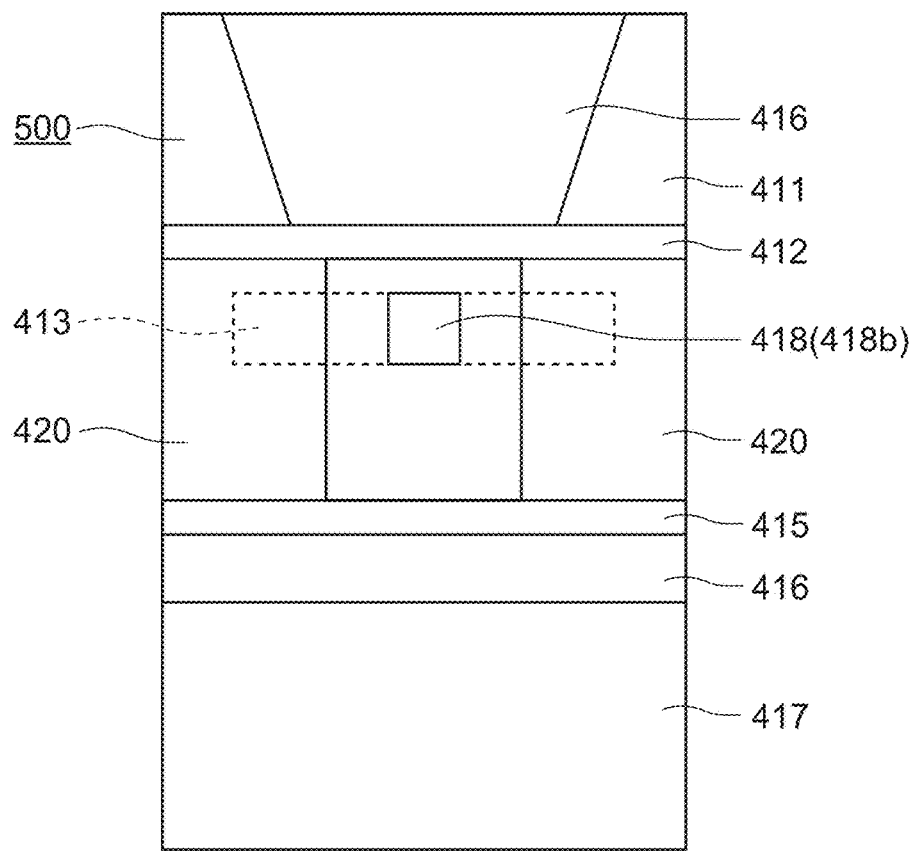
FIG. 19 is a front view illustrating the ABS of another conventional thermally assisted magnetic head.
Figure 20:
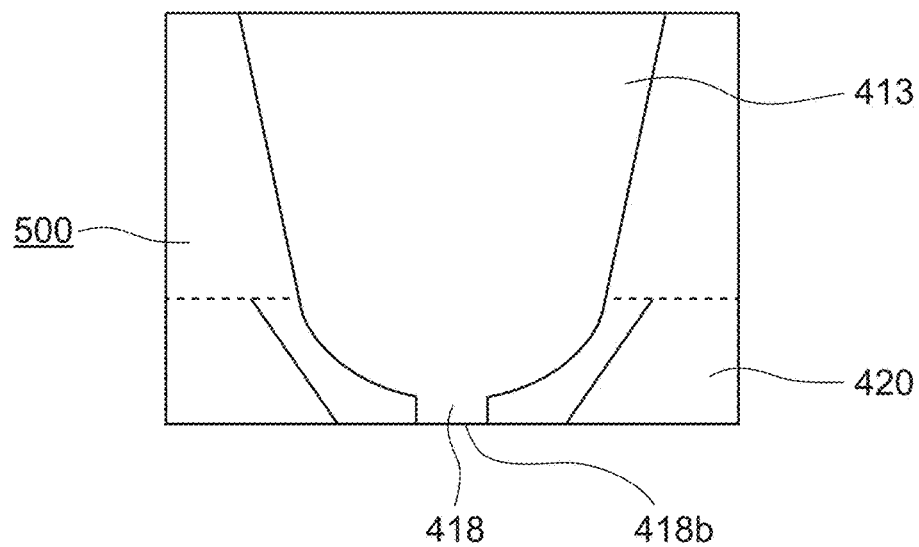
FIG. 20 is a plan view illustrating the sectional surface including an upper surface of the NFT of another conventional thermally assisted magnetic head.
Figure 21:
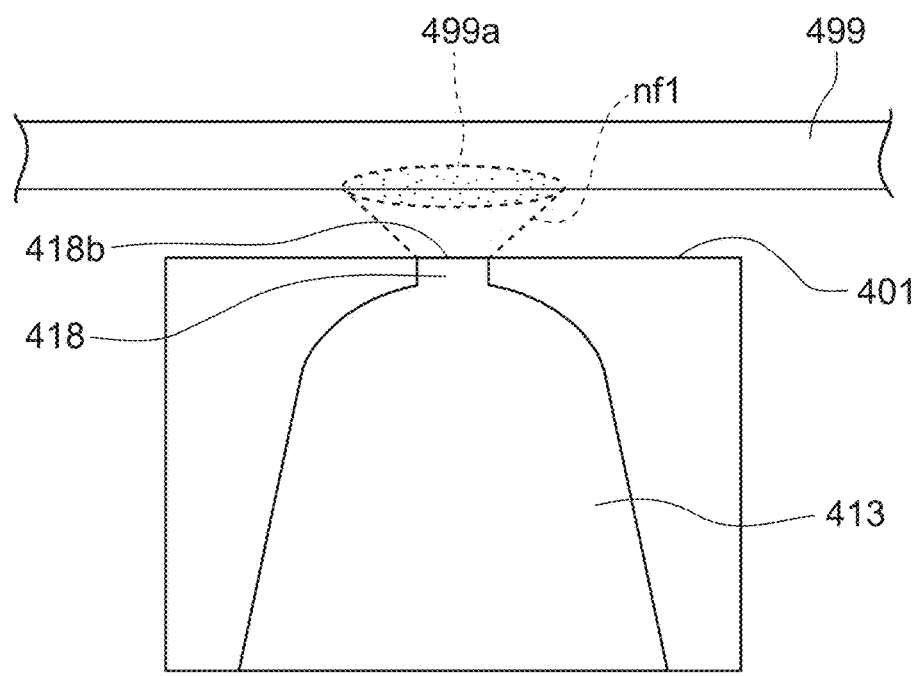
FIG. 21 is a plan view illustrating the thermally assisted magnetic head in FIG. 17 and the hard disk when the intensity of laser light is small.
Figure 22:
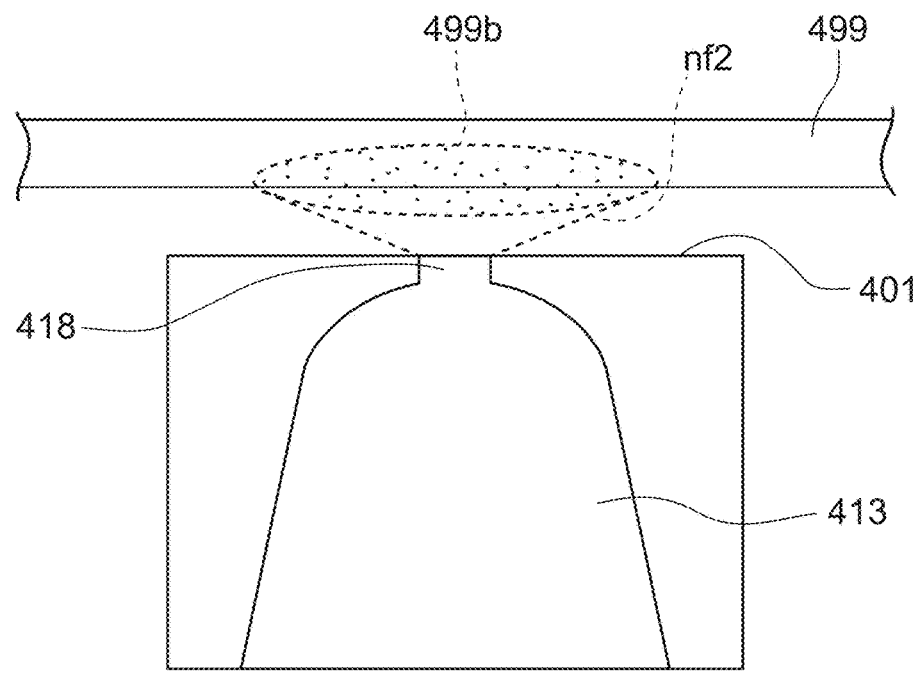
FIG. 22 is a plan view illustrating the thermally assisted magnetic head in FIG. 17 and the hard disk when the intensity of laser light is large.
Figure 23:
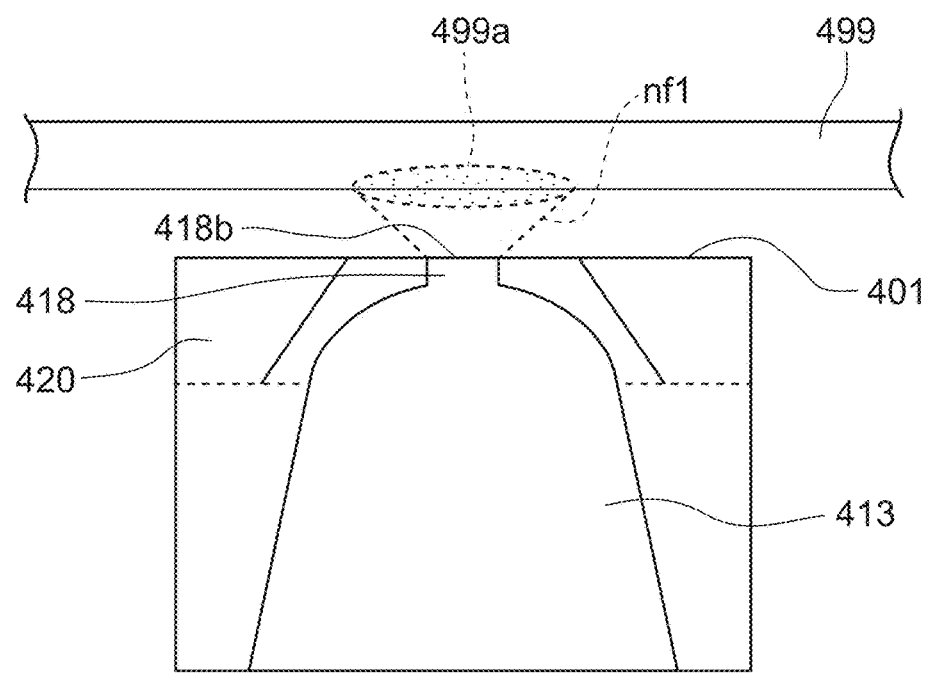
FIG. 23 is a plan view illustrating the thermally assisted magnetic head in FIG. 19 and the hard disk when the intensity of laser light is small.
Figure 24:
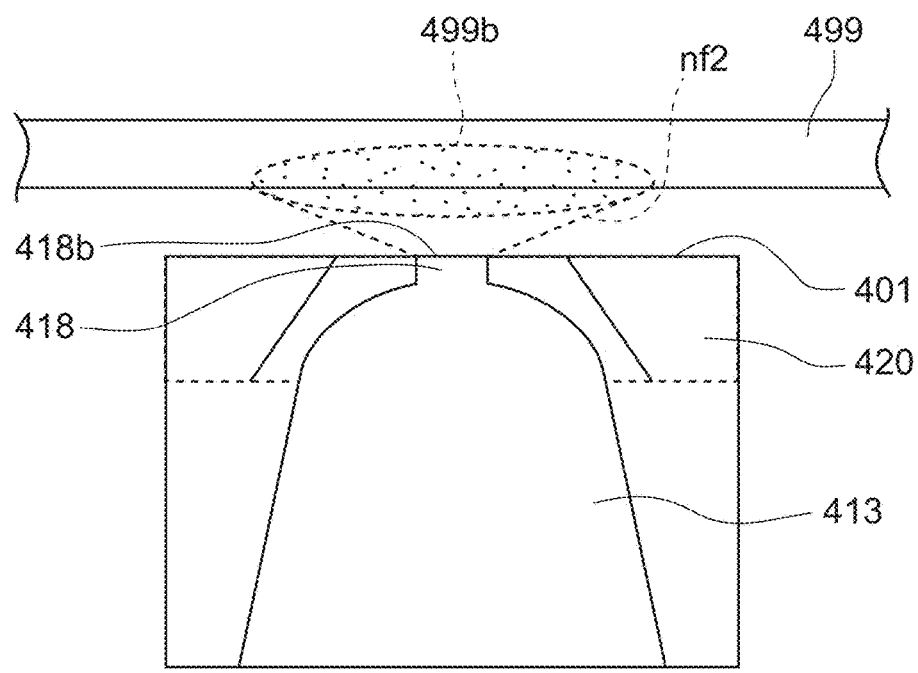
FIG. 24 is a plan view illustrating the thermally assisted magnetic head in FIG. 19 and the hard disk when the intensity of laser light is large.

By the way, in case of the conventional thermally assisted magnetic head 400, as illustrated in FIG. 17, FIG. 21, the end-surface 418b of the PEG 418 is arranged in the ABS 401. Further, even if the optical shields 420 are arranged in the ABS 401, as the conventional thermally assisted magnetic head 500, as illustrated in FIG. 19, FIG. 23, the end-surface 418b of the PEG 418 is arranged in the ABS 401. Therefore, the thermal zone, on the magnetic recording medium, is likely to be enlarged in accordance with the enhancement of the intensity of laser light.

To the contrary, in case of the thermally assisted magnetic head 180 according to this embodiment, the PEG 31 has the recess structure. Namely, the PEG end-surface 33 is arranged in the position receding from the ABS 1. Further, the OSS 50 are formed so as to sandwich the NFT 30 from the both sides along the ABS direction.

Figure 8:
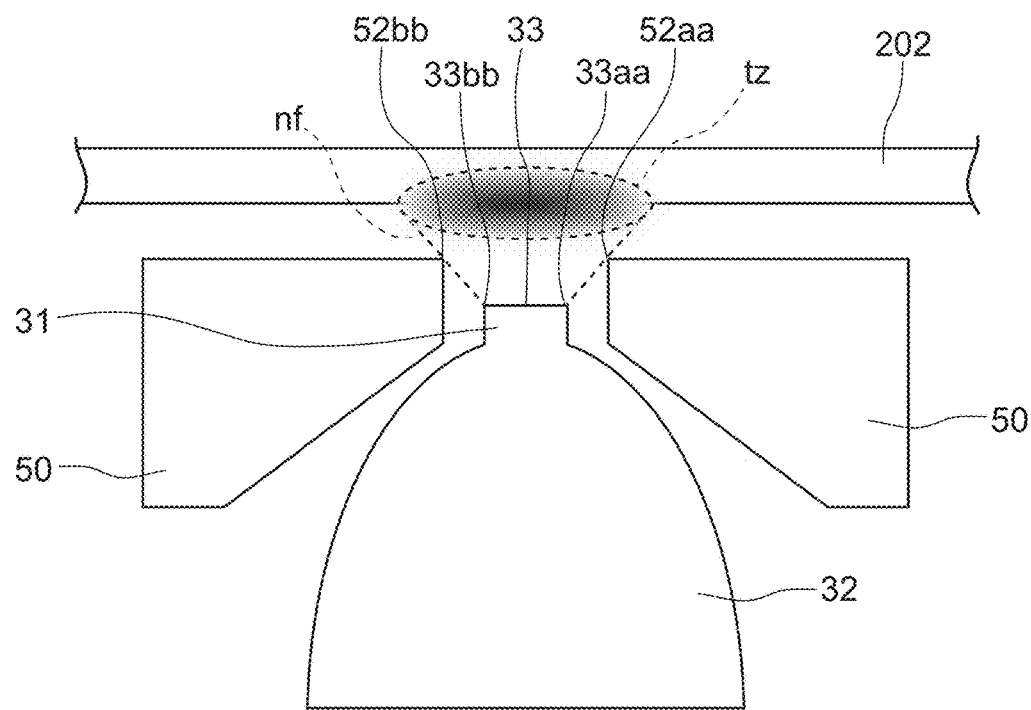
FIG. 8 is a plan view, partially omitted, illustrating principal parts of the optical side shields, the near field transducer, the hard disk and the thermal zone, in case of small laser light intensity.

Therefore, as illustrated in FIG. 8, when the near-field light nf is applied from the PEG end-surface 33 to the hard disk 202, outer parts of the near-field light nf are cut off by the OSS 50. The OSS 50 are arranged in the hard disk 202 side than the PEG end-surface 33, as illustrated in FIG. 4, FIG. 5, corner parts 52aa, 52bb of the shield concave part 52 are arranged in the outer front of the PEG end-surface 33 in the hard disk 202 side. Therefore, outer parts of the near-field light nf are cut off by the OSS 50, and they do not reach the hard disk 202. Therefore, applying zone of the near-field light nf is narrowed down. Therefore, the thermal zone tz is hardly enlarged, even if the intensity of laser light is enhanced. Accordingly, the down track thermal gradient, DTTG) and cross track thermal gradient, CTTG) are enhanced.

Figure 9:
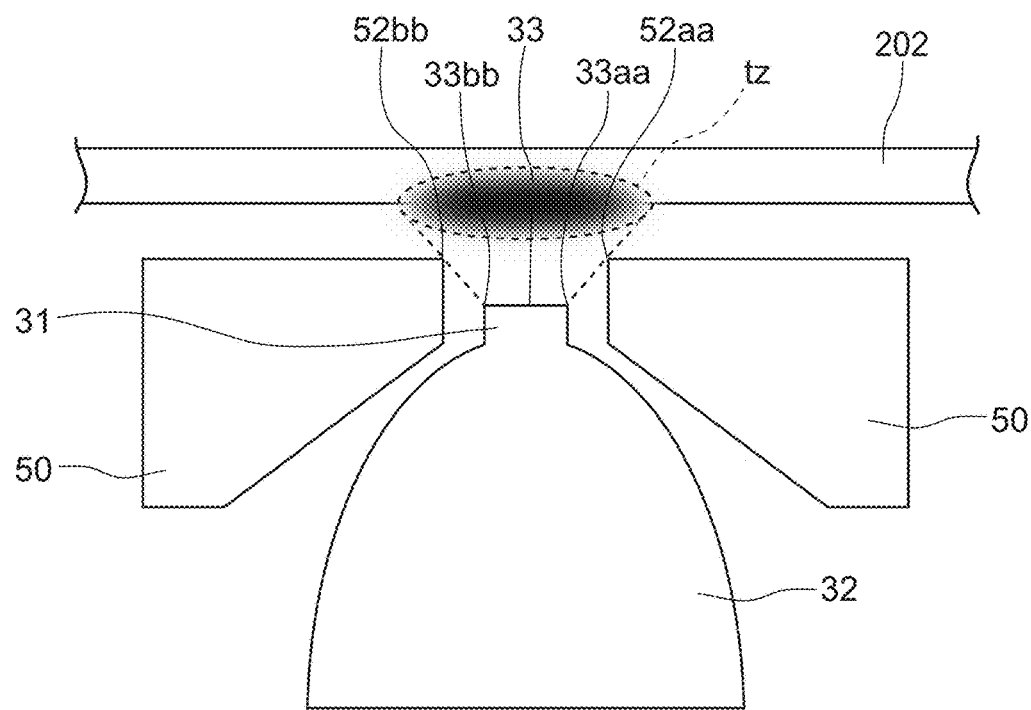
FIG. 9 is a plan view, partially omitted, illustrating principal parts of the optical side shields, the near field transducer, the hard disk and the thermal zone, in case of large laser light intensity.

On the other hand, the intensity of laser light is enhanced, as illustrated in FIG. 9, an area, having large temperature rising by applying the near-field light nf, in the thermal zone tz, is enlarged. However, outer parts of the near-field light nf are cut off by the OSS 50, and they do not reach the hard disk 202. Accordingly, in the thermally assisted magnetic head 180, even if the intensity of laser light is enhanced, an area, having large temperature rising, is enlarged though, the thermal zone tz is hardly enlarged.

Figure 10:
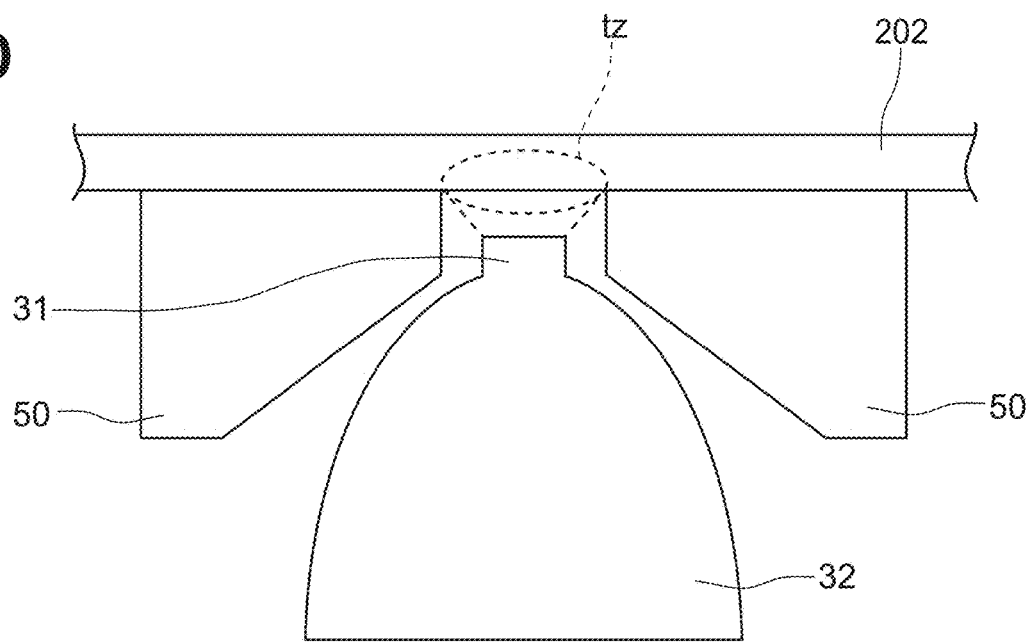
FIG. 10 is a plan view, partially omitted, illustrating principal parts of the optical side shields, the near field transducer, the hard disk and the thermal zone, in case of being in contact with the hard disk.

Further, because the PEG 31 has the recess structure, as illustrated in FIG. 10, even if the thermally assisted magnetic head 180 is in contact with the hard disk 202, the PEG end-surface 33 is not contact with the hard disk 202. Therefore, the PEG 31 is prevented from being damaged. At this point, in case of the thermally assisted magnetic head 180, the block end-part 44a is arranged between the PEG end-surface 33 and the ABS 1. Therefore, because the PEG end-surface 33 is protected by the block end-part 44a, the PEG 31 is surely prevented from being damaged.

Further, because the PEG end-surface 33 is arranged inside the shield concave part 52, the OSS 50 are arranged both sides of the PEG end-surface 33 along the ABS direction. Therefore, the near-field light nf, spreading outside, are surely cut off by the OSS 50 on the both sides along the ABS direction.

Further, the PEG 31 and the OSS 50 are formed so that the respective PEG side-surfaces 33a, 33b are opposite to the respective opposing wall parts 52a, 52b. Therefore, the near-field light nf, seeped from the PEG side-surfaces 33a, 33b, are surely cut off by the OSS 50.

Further, because the shield depth 52D is larger than the PEG depth 31D, the recess structure is able to be formed, even if the PEG 31 is arranged in the position near the ABS 1.

Because the concave part width 52W is larger than the PEG width 31W, the shield concave part 52 is arranged both sides of the PEG 31. Therefore, the near-field light nf is surely cut off by the OSS 50.

The PEG 31 is arranged in the middle of the shield concave part 52 along the ABS direction. Then the PEG interval Wa, illustrated in FIG. 6, is equal to the PEG interval Wb, illustrated in FIG. 6. Therefore, the near-field light nf is cut off similarly by the OSS 50, on the both sides of the PEG 31.

Because the PEG end-surface 33 is arranged in the position which recedes from the ABS 1 than the middle line 52M, both of PEG angles αA, αB, illustrated in FIG. 6, are able to become more acuter angles. Then, the near-field light nf are able to be narrowed down in the narrower area. Note that the PEG angles αA(αB) are angles defined by extending lines of the PEG side-surfaces 33a (33b) and corner parts lines, connecting the PEG corner parts 33aa(33bb) and shield corner parts 52aa (52bb) (about the PEG corner parts 33aa, 33bb, see FIG. 5).

Figure 11:
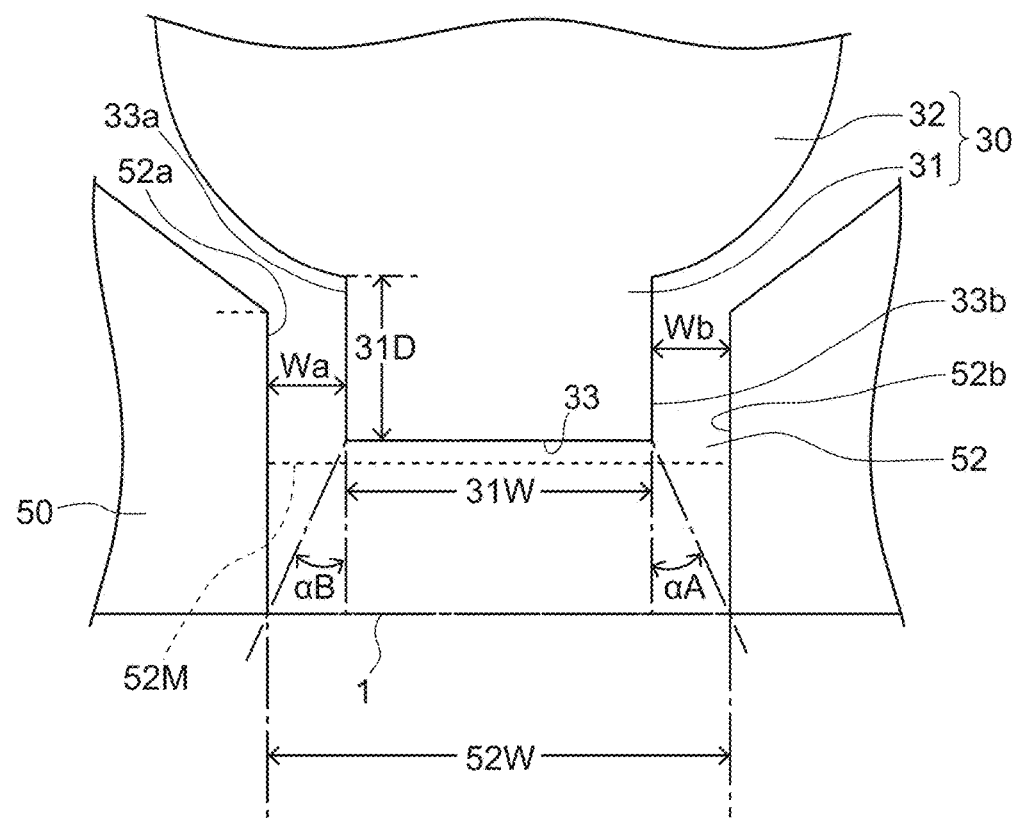
FIG. 11 is a plan view, partially omitted, illustrating principal parts of the optical side shields and the near field transducer when a PEG end-surface is arranged in the position near the ABS than FIG. 6.

At this point, as illustrated in FIG. 11, when the PEG end-surface 33 is arranged in the position near the middle line 52M, the PEG angles αA(αB) become larger. However, because both of the PEG angles αA, αB, illustrated in FIG. 11, are acute angles, the near-field light nf is narrowed down in the narrow area.

Further, because the sum of the PEG interval Wa and the PEG interval Wb is smaller than the PEG width 31W, the opposing wall parts 52a, 52b are arranged near the PEG side-surfaces 33a, 33b. Then the near-field light nf are narrowed down in the narrower area by the OSS 50.

Figure 12:
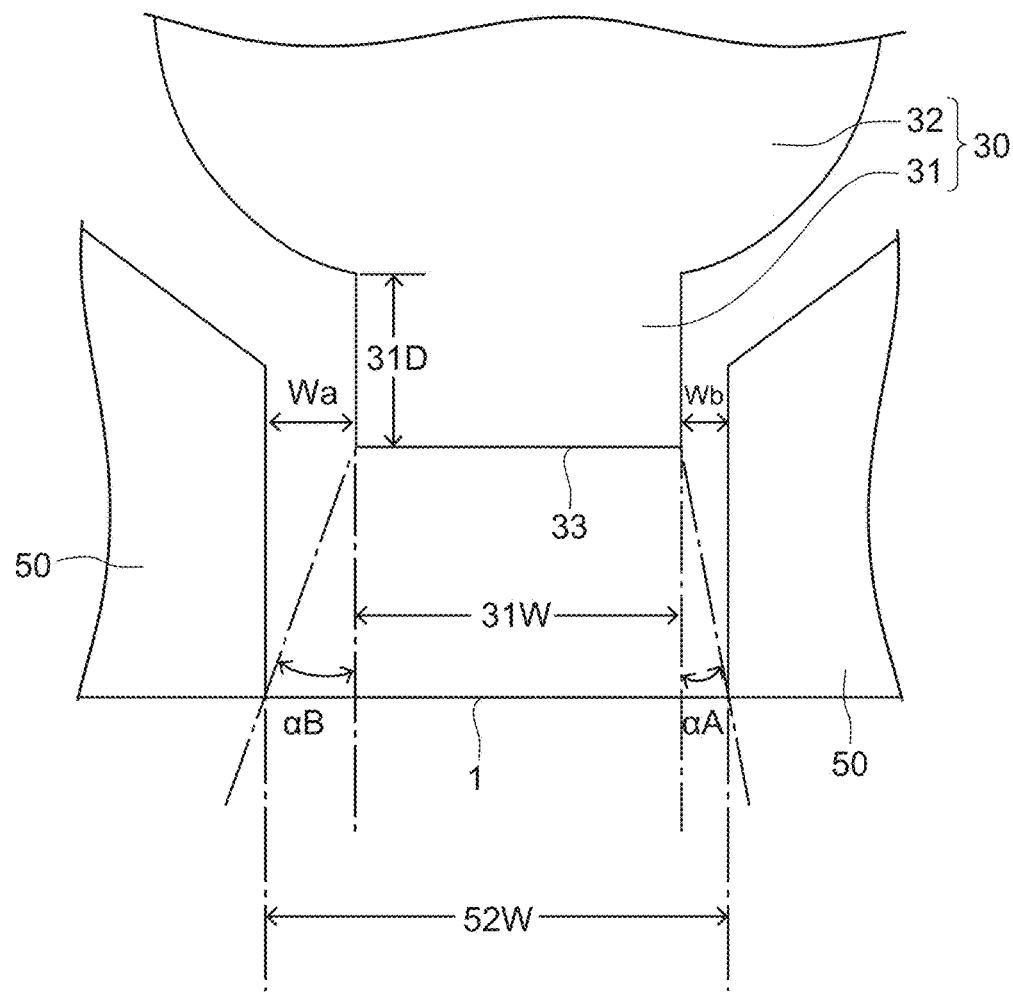
FIG. 12 is a plan view, partially omitted, illustrating principal parts of the optical side shields and the near field transducer when PEG intervals are different.

Then as illustrated in FIG. 12, it is possible that the PEG interval Wa is different from the PEG interval Wb (Wa>Wb). In this case, because both the PEG angles αA, αB, illustrated in FIG. 12, are acute angles, the near-field light nf is narrowed down in the narrow area.

Modified Example 1

Figure 13:
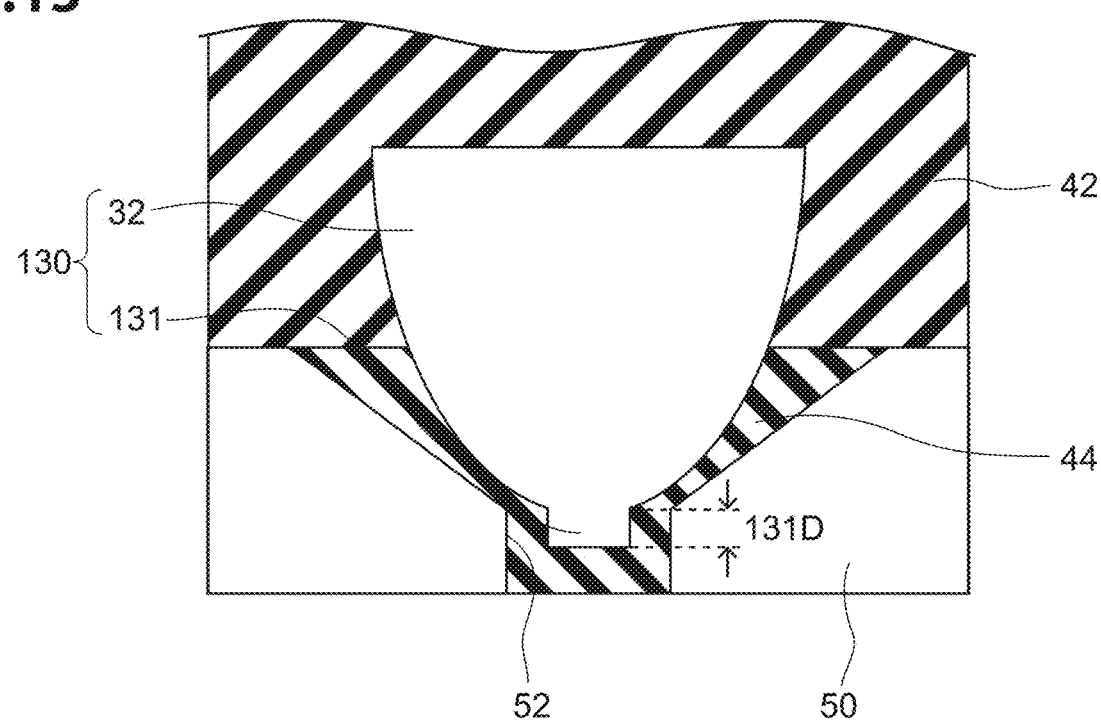
FIG. 13 is a plan view, corresponding to FIG. 3, illustrating a sectional surface of the thermally assisted magnetic head having the near field transducer according to a modified example.

An NFT 130, according to the modified example, will be explained with reference to FIG. 13. The NFT 130 is different in that it has a PEG 131 instead of the PEG 31, as compared with the NFT 30.

A PEG depth 131D, of the PEG 131, is smaller than the PEG depth 31D of the PEG 31. The PEG 131 has the recess structure, similar with the PEG 31, and it has the OSS 50. Therefore, the thermal zone tz is hardly enlarged.

Modified Example 2

Figure 14:
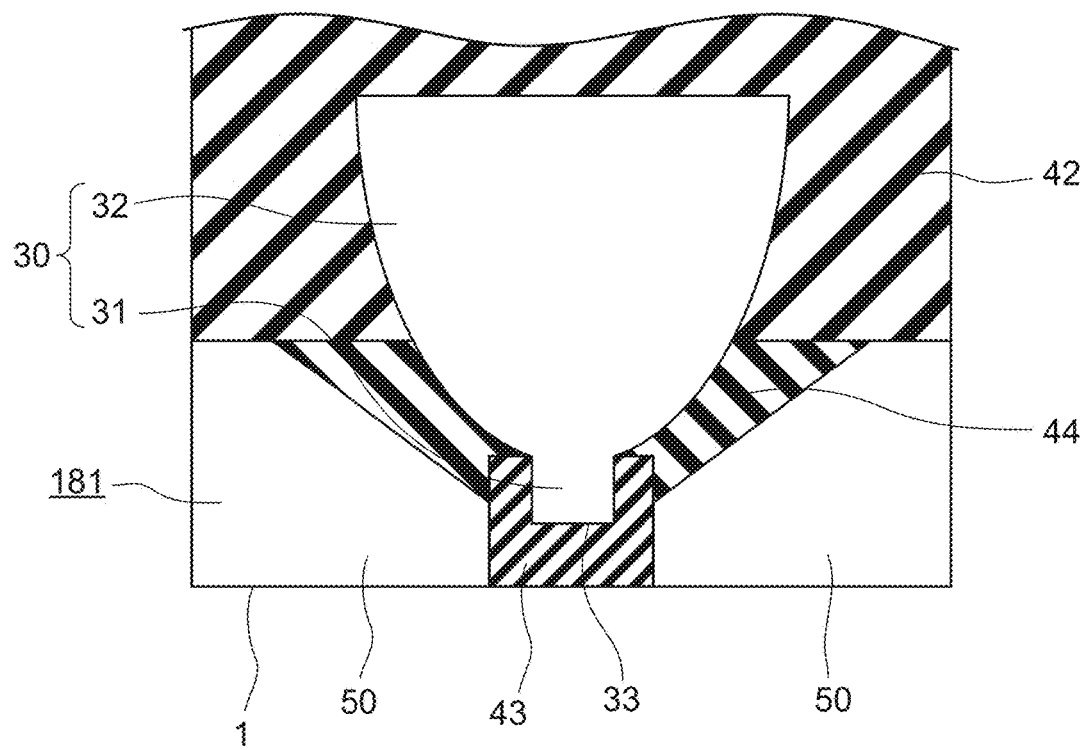
FIG. 14 is a plan view, corresponding to FIG. 3, illustrating a sectional surface of the thermally assisted magnetic head having the near field transducer according to another modified example.

A thermally assisted magnetic head 181, according to the modified example, will be explained with reference to FIG. 14. The thermally assisted magnetic head 181 is different in that it has a PEG cover 43, as compared with the thermally assisted magnetic head 180.

The PEG cover 43 is formed with a material having high thermal conductivity. The PEG cover 43 is arranged in a part between the ABS 1 and the PEG end-surface 33, and the peripheral part of the PEG 31. Because temperature increase due to the near-field light of become better, when the cover 43 is formed, the hard disk 202 is heated more effectively. Most suitable LD current, for effective heating of the hard disk 202, is lowered.

(Embodiments of Head Gimbal Assembly and Hard Disk Drive)

Next, embodiments of the head gimbal assembly and hard disk drive will now be explained with reference to FIG. 15 to FIG. 16.

Figure 15:
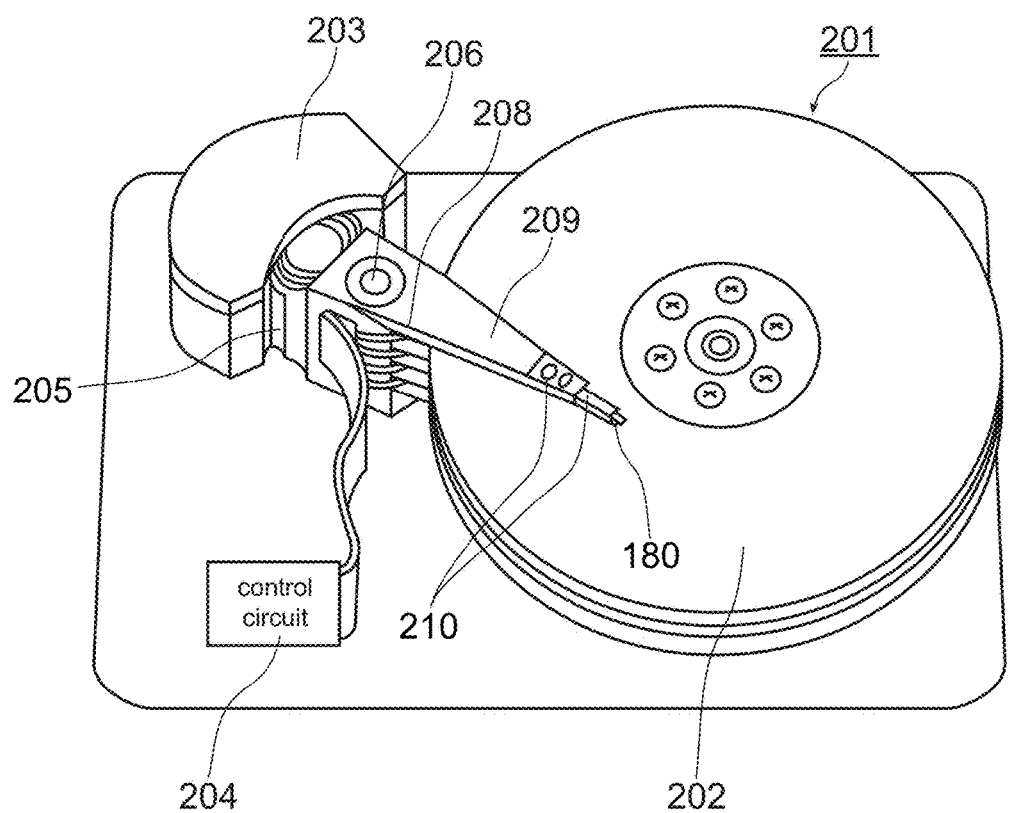
FIG. 15 is a perspective view illustrating a hard disk drive equipped with the thermally assisted magnetic head in FIG. 1.

FIG. 15 is a perspective view showing a hard disk drive 201 equipped with the above-mentioned thermally assisted magnetic head 180. The hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding the thermally assisted magnetic head 180.

The hard disk drive 201 positions the slider 120 on a track by an assembly carriage device 203. Further, the hard disk drive 201 has a plurality of drive arms 209. The drive arms pivot about a pivot bearing shaft 206 by means of a voice coil motor (VCM) 205, and are stacked in a direction along the pivot bearing shaft 206. Further, the HGA 210 is attached to the tip of each drive arm.

Further, the hard disk drive 201 has a control circuit 204 controlling recording/reproducing and the generation of light by the laser diode 130.

Figure 16:
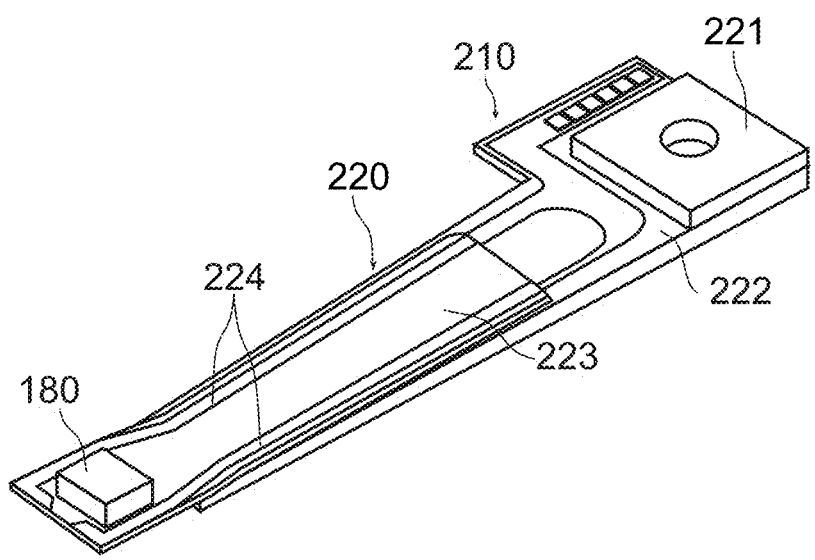
FIG. 16 is a perspective view illustrating a rear side of the HGA.

FIG. 16 is a perspective view illustrating a rear surface side of the HGA 210. In the HGA 210, the thermally assisted magnetic head 180 is fixed to a tip portion of a suspension 220. Further, in the HGA 210, one end portion of a wiring member 224 is electrically connected to a terminal electrode of the slider 120.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

In the hard disk drive 201, when the HGA 210 is rotated, the slider 120 moves in a radial direction of the hard disk 202, i.e., a direction traversing track lines.

The aforementioned HGA 210 and hard disk drive 201 have the thermally assisted magnetic head 180, thereby the thermal zone, due to the near-field light, is hardly enlarged, even if the intensity of laser light is enhanced.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A thermally assisted magnetic head comprising:
   a main magnetic pole layer having a magnetic pole end face arranged in a medium-opposing surface opposing to a magnetic recording medium;
   a near-field transducer which generates a near-field light for heating the magnetic recording medium;
   a waveguide guiding light to the near-field transducer; and
   an optical side shield being arranged in the medium-opposing surface side of the waveguide and being formed so as to sandwich a part of the near-field transducer, in the medium-opposing surface side, from both sides of a direction along the medium-opposing surface;
   wherein the near-field transducer includes a protruding end-part (PEG), arranged in the medium-opposing surface side, wherein the protruding end-part is arranged to have a PEG end-surface at a position receded from the medium-opposing surface, wherein the waveguide comprises a waveguide end-part, arranged in the medium-opposing surface, wherein the waveguide end-part is arranged between the PEG end-surface and the medium-opposing surface.

2. The thermally assisted magnetic head according to claim 1, wherein the optical side shield comprises a shield surface, arranged in the medium-opposing surface, and a shield concave part, extending from the shield surface along an intersecting direction, which intersects to the medium-opposing surface, wherein the PEG end-surface is arranged inside of the shield concave part.

3. The thermally assisted magnetic head according to claim 2, wherein the shield concave part comprises a pair of opposing wall parts, extending from the shield surface, along the intersecting direction, wherein the protruding end-part comprises a pair of PEG side-surfaces, extending from the PEG end-surface, along the intersecting direction, wherein the protruding end-part and the optical side shield are formed so that the opposing wall parts and the PEG side-surfaces are opposite each other.

4. The thermally assisted magnetic head according to claim 2, wherein the shield concave part is formed so that a concave part width, along the medium-opposing surface, is larger than a PEG width, of the protruding end-part, along the medium-opposing surface.

5. The thermally assisted magnetic head according to claim 2, wherein the protruding end-part is arranged in the middle of the shield concave part, along the medium-opposing surface.

6. The thermally assisted magnetic head according to claim 2, wherein the PEG end-surface of the protruding end-part is arranged in the position recedes from the medium-opposing surface, than a middle line showing the middle of the intersecting direction.

7. A thermally assisted magnetic head comprising:
a main magnetic pole layer having a magnetic pole end face arranged in a medium-opposing surface opposing to a magnetic recording medium;
a near-field transducer which generates a near-field light for heating the magnetic recording medium;
a waveguide guiding light to the near-field transducer; and
an optical side shield being arranged in the medium-opposing surface side of the waveguide and being formed so as to sandwich a part of the near-field transducer, in the medium-opposing surface side, from both sides of a direction along the medium-opposing surface;
wherein the near-field transducer includes a protruding end-part (PEG), arranged in the medium-opposing surface side,
wherein the protruding end-part is arranged to have a PEG end-surface at a position receded from the medium-opposing surface,
wherein the optical side shield comprises a shield surface, arranged in the medium-opposing surface, and a shield concave part, extending from the shield surface along an intersecting direction, which intersects to the medium-opposing surface, wherein the PEG end-surface is arranged inside of the shield concave part, wherein the shield concave part is formed so that a shield depth, along the intersecting direction, is larger than a PEG depth, of the protruding end-part, along the intersecting direction.

8. The thermally assisted magnetic head according to claim 7, wherein the protruding end-part and the shield concave part are formed so that the difference of the concave part width and the PEG width is smaller than the PEG width.

9. A head gimbal assembly comprising a thermally assisted magnetic head, wherein the thermally assisted magnetic head comprising:
a main magnetic pole layer having a magnetic pole end face arranged in a medium-opposing surface opposing to a magnetic recording medium;
a near-field transducer which generates a near-field light for heating the magnetic recording medium;
a waveguide guiding light to the near-field transducer; and
an optical side shield being arranged in the medium-opposing surface side of the waveguide and being formed so as to sandwich a part of the near-field transducer, in the medium-opposing surface side, from both sides of a direction along the medium-opposing surface;
wherein the near-field transducer includes a protruding end-part (PEG), arranged in the medium-opposing surface side,
wherein the protruding end-part is arranged to have a PEG end-surface at a position receded from the medium-opposing surface,
wherein the waveguide comprises a waveguide end-part, arranged in the medium-opposing surface,
wherein the waveguide end-part is arranged between the PEG end-surface and the medium-opposing surface.

10. A hard disk drive comprising a head gimbal assembly having a thermally assisted magnetic head, and a magnetic recording medium opposing the thermally assisted magnetic head, wherein the thermally assisted magnetic head comprising:
a main magnetic pole layer having a magnetic pole end face arranged in a medium-opposing surface opposing to a magnetic recording medium;
a near-field transducer which generates a near-field light for heating the magnetic recording medium;
a waveguide guiding light to the near-field transducer; and
an optical side shield being arranged in the medium-opposing surface side of the waveguide and being formed so as to sandwich a part of the near-field transducer, in the medium-opposing surface side, from both sides of a direction along the medium-opposing surface;
wherein the near-field transducer includes a protruding end-part (PEG), arranged in the medium-opposing surface side,
wherein the protruding end-part is arranged to have a PEG end-surface at a position receded from the medium-opposing surface,
wherein the waveguide comprises a waveguide end-part, arranged in the medium-opposing surface, wherein the waveguide end-part is arranged between the PEG end-surface and the medium-opposing surface.

\* \* \* \* \*